United States Patent [19]

Yamada

[11] 4,196,349

[45] Apr. 1, 1980

[54] CLOCK SIGNAL PRODUCING DEVICE FOR A CARD READER

[75] Inventor: Tsutomu Yamada, Shiojiri, Japan

[73] Assignees: Kabushiki Kaisha Suwa Seikosha, Tokyo; Shinshu Seiki Kabushiki Kaisha, Nagoya, both of Japan

[21] Appl. No.: 948,619

[22] Filed: Oct. 4, 1978

[30] Foreign Application Priority Data

Oct. 4, 1977 [JP] Japan .................................. 52-119160

[51] Int. Cl.² ...................... G06K 7/016; G11B 27/26
[52] U.S. Cl. ............................ 250/231 SE; 235/474; 235/475; 250/569
[58] Field of Search ................. 250/231 SE, 569, 570; 235/474, 475, 466

[56] References Cited

U.S. PATENT DOCUMENTS

| | | | |
|---|---|---|---|
| 3,735,098 | 5/1973 | Hirata | 235/474 X |
| 3,796,861 | 3/1974 | Hirata et al. | 235/474 |
| 3,914,789 | 10/1975 | Coker, Jr. et al. | 235/474 X |

Primary Examiner—David C. Nelms
Assistant Examiner—Edward P. Westin
Attorney, Agent, or Firm—Blum, Kaplan, Friedman, Silberman & Beran

[57] ABSTRACT

A device for reading the data on a card where the data are recorded in the form of marks or punched holes and the like includes means for producing a clock signal, such a clock signal being necessary for reading the data. The device is mechanical and eliminates the need for timing marks. Transit of the card through the device generates an optical signal which is converted into an electrical signal which, in turn, constitutes the clock signal.

5 Claims, 5 Drawing Figures

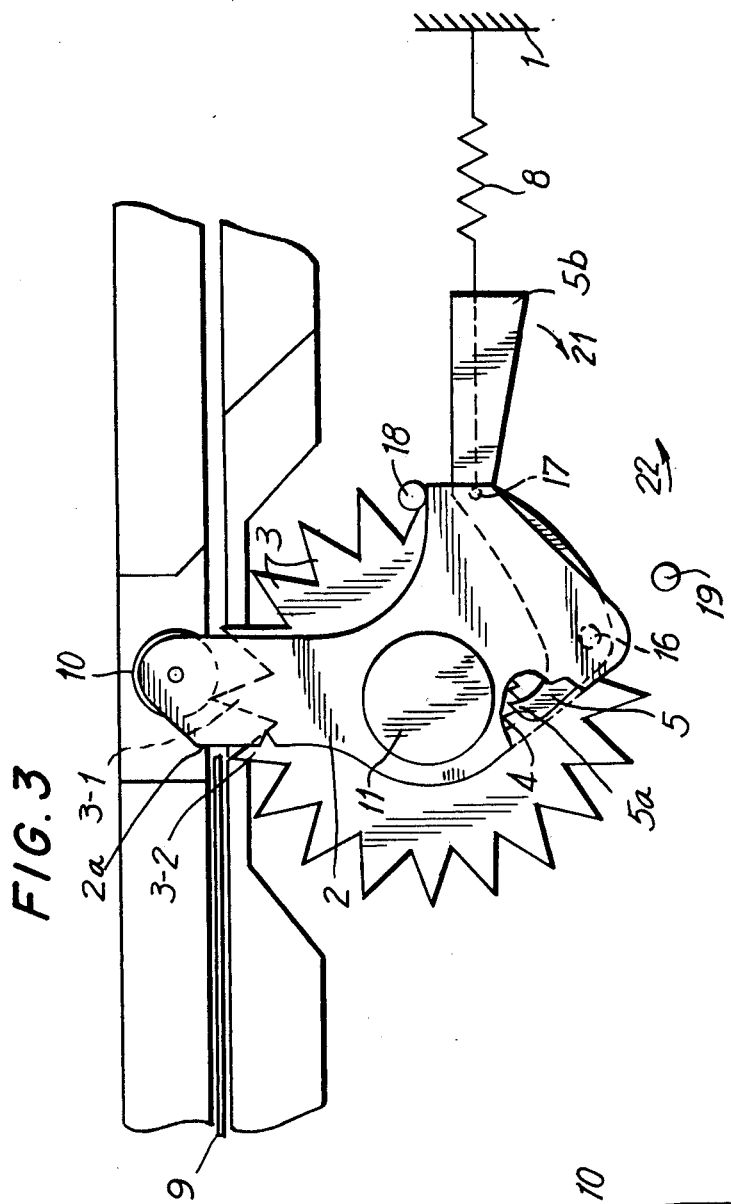
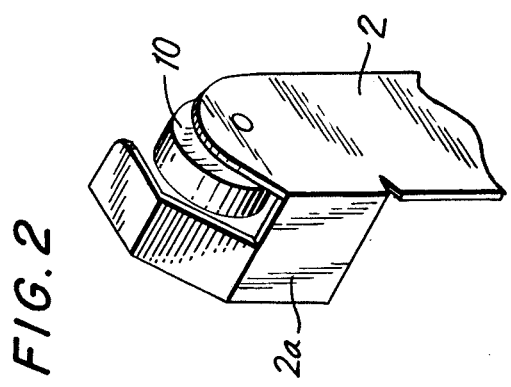

CLOCK SIGNAL PRODUCING DEVICE FOR A CARD READER

BACKGROUND OF THE INVENTION

In a conventional clock-signal-producing device, a plate with slits therein passes through the reading portion of the device concommitantly with a card. The plate is slitted with a plurality of slits which correspond to the timing marks on cards. In another conventional device, the card is made to adhere closely to a fan-shaped face and to rotate in connection with a support on the intersection of two straight lines of the fan-shape as a means of detecting the angle of rotation and to generate a clock signal. However, all of the conventional methods involved complex structures which are large in scale and high in cost. Moreover, the operational rate of such card-reading devices is slow in comparison of the rate at which the card can traverse the device.

The present invention has the objective of overcoming the faults and defects of conventional clock-signal-producing means.

SUMMARY OF THE INVENTION

A clock-signal-producing device in accordance with the present invention comprises a frame and a shaft mounted on said frame for rotation, said shaft having fixedly attached thereto a ratchet wheel, a coaxial toothed wheel and a slitted circular plate. Also mounted on said shaft but not affixed thereto is a trigger lever.

A guidance member and guidance rollers provide for transferring a data-bearing card through said device. As the tip of a card passes through the guidance member it makes contact with an end of the trigger lever and pulls the trigger lever against the urging of a biasing spring from a stationary position to an operating position. An index lever is mounted for rotation on said trigger lever and has a toothed end which engages said ratchet wheel when said trigger lever is in said stationary position, preventing said ratchet wheel and said shaft from rotating. When said trigger lever is moved from said stationary position to said operating position under the urging of the tip of a card, said index lever is disengaged from said ratchet wheel and said toothed wheel is brought into rotation by contact with said card. A light-generating means transmits light through the slits in said slitted wheel as it rotates, the resulting optical pulses being sensed by a light-sensing and signal-generating means which converts said light pulses into electrical signals, these constituting the clock signals necessary for reading the data on the card.

Preferably, the trigger lever has a loose pulley mounted on the end thereof making contact with a card transiting said device to facilitate frictionless transfer through the device. Also, preferably, the ratchet wheel and the toothed wheel have the same number of teeth and the shape of the teeth on said tooth wheel is similar to those on a saw.

Accordingly, an object of the present invention is a device for producing clock signals where said device is low in cost, small in size and can operate rapidly.

Another object of the present invention is a clock-signal-producing device wherein a card transiting said device displaces a trigger lever from a standby position and sets a toothed wheel in rotation, said toothed wheel being coaxial with a circular plate having slits therein.

A further object of the present invention is a clock-signal-producing device wherein optical pulses transit the slits in a circular plate, these optical pulses are converted into electrical clock signals and said circular plate rotates in unison with a toothed wheel which is brought into rotation by transit of a data-bearing card through said device.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawings in which:

FIG. 2 is a perspective view of an end of a trigger lever in a preferred embodiment;

FIG. 3 showing the device of the present invention in standby condition as a card is about to make contact with said trigger lever.

DESCRIPTION OF THE PREFERRED EMBODIMENTS

Figure 1A:
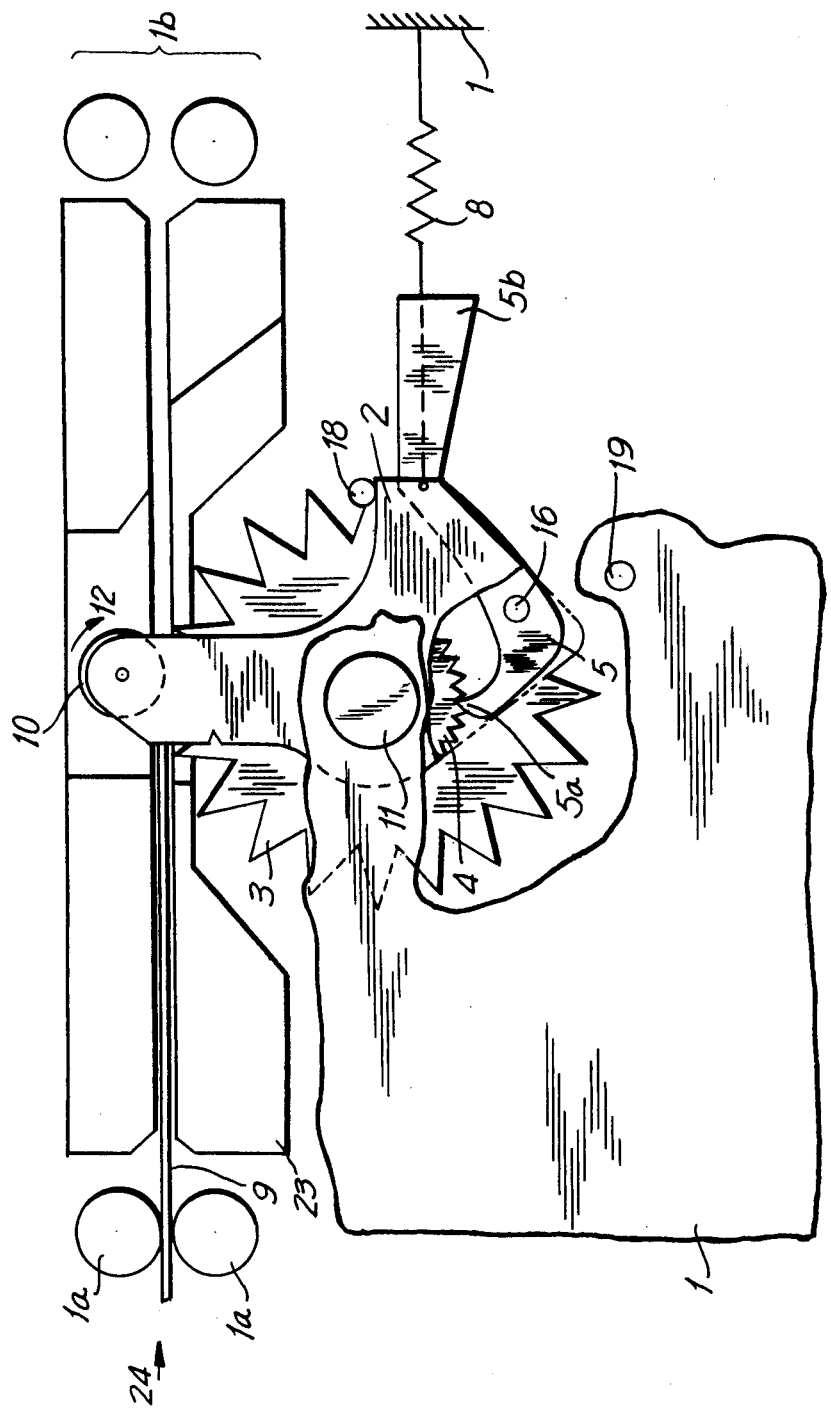
FIG. 1a is an elevational view of an embodiment of the invention.

An embodiment of the present invention is shown in FIG. 1a in which a frame 1 has mounted thereto guidance rollers 1a and 1b and guidance means 23 for transferring and guiding a card 9 therethrough in the direction indicated by the arrow 24. A trigger lever 2 is mounted on but not affixed to shaft 11 which is mounted for rotation on frame 1. An end of trigger lever 2 is so disposed that as card 9 transits the device under the urging of rollers 1a, trigger lever 2 is rotated from standby position to operating position, the direction of rotation as viewed in the Figures being clockwise. Trigger lever 2 has a smooth planar surface 2a with which card 9 makes initial contact as it transits the device, surface 2a being smooth so that it will not damage the card. Further to facilitate transfer of the card across the end of trigger lever 2, said trigger lever is fitted with a loose wheel 10 (FIG. 2). The advance of the card across trigger lever 2 is smoothly carried out and the card is not damaged in any way should it become necessary as the result of malfunction to pull the card 9 out of the device in either direction.

Figure 1B:
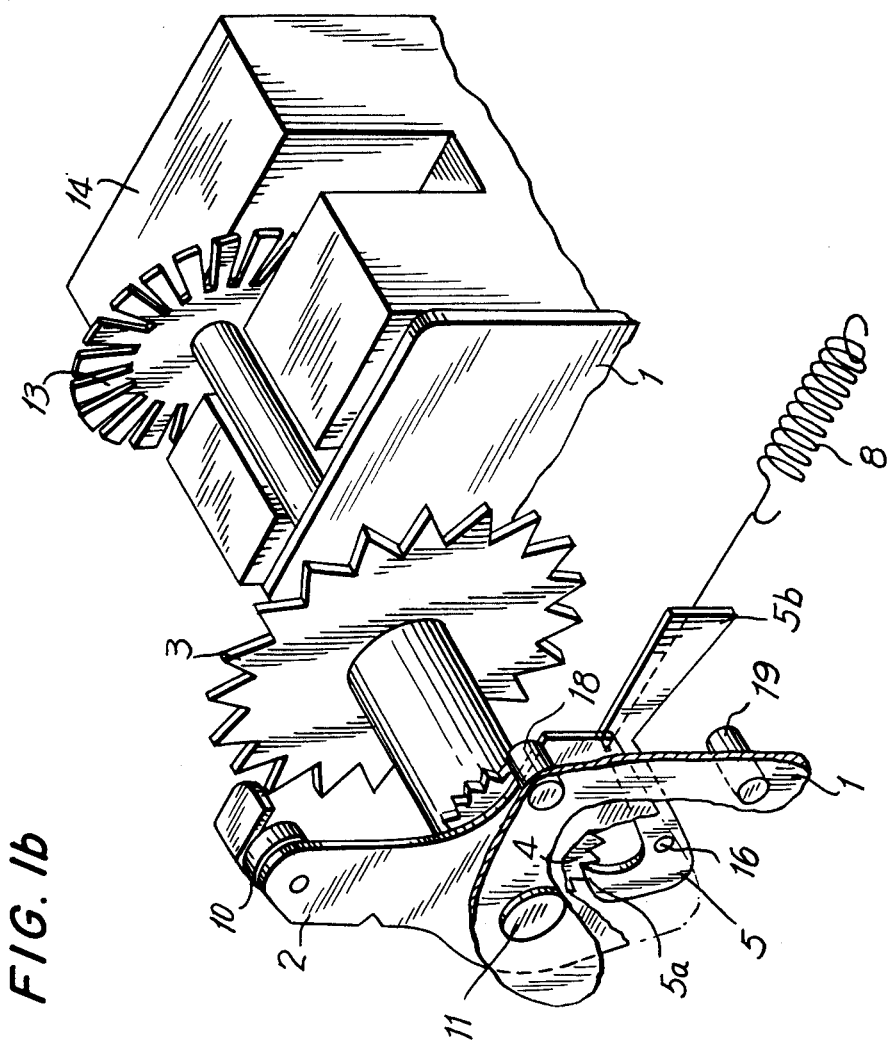
FIG. 1b is a perspective view of said embodiment.

Trigger lever 2 is fitted with an index lever 5 which can rotate around pin 16 which is mounted on trigger lever 2. As shown in FIGS. 1a, 1b and FIG. 3, when trigger lever 2 is in standby condition, biasing means 8, which is preferably a coil spring, indirectly urges said trigger lever 2, through its connection to said index lever at pin 16 in counterclockwise direction as viewed in said Figures. Also, since said biasing means 8 is attached to tail end 5b of index lever 5 by suitable means such as a pin 17, said index lever 5 is urged in clockwise direction around pin 16, thereby holding toothed end 5a of index lever in engagement with ratchet wheel 4 which is rigidly affixed to shaft 11, thereby holding said shaft and toothed wheel stationary as well as toothed wheel 3 and slotted circular plate 13 stationary, said toothed wheel 3 and slotted circular plate 13 also being rigidly affixed to shaft 11.

The state of the device in standby condition is shown in FIG. 3 just before a card 9 makes contact with surface 2a of trigger lever 2. The position of the trigger lever is established by contact of said lever under the urging of biasing means 8 against stopping means 18, preferably in the form of a pin, which is affixed to frame 1. As is evident from FIG. 3, biasing means 8 urges said trigger lever 2 in the direction indicated by arrow 22 so that it makes contact with said first stopper means 18. The wheels and plate attached to shaft 11 are also fixed in position as the result of index lever 5 engaging ratchet wheel 4, ratchet wheel 4 preferably having the same number of teeth as toothed wheel 3. In standby position, teeth 3-1 and 3-2 of wheel 3 are not as yet engaged by card 9. All of the teeth on wheel 3 are of the same shape so that they all function in the same manner when making contact with card 9.

Figure 4:
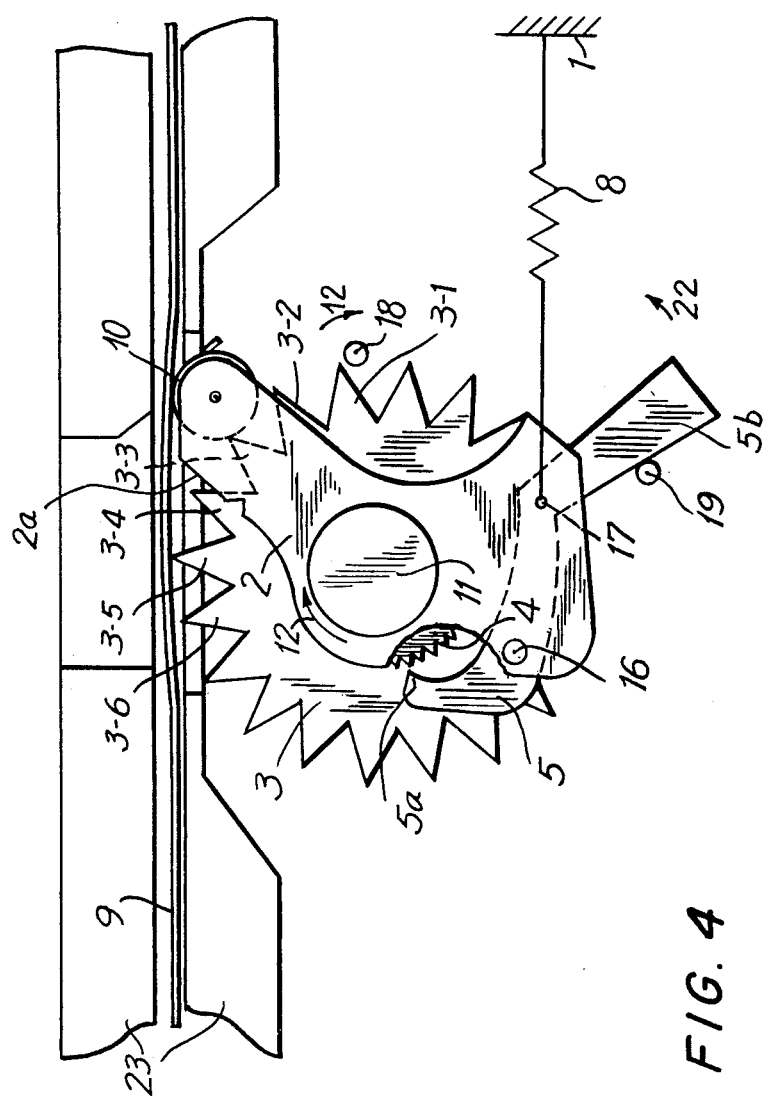
FIG. 4 shows the device of the present invention in operating condition.

Now referring to FIG. 4, the tip of card 9 first pushes the trigger lever in the direction of arrow 12 bringing loose pulley 10 into contact with the lower surface of card 9 and this condition is maintained during the entire transit of the card through the device. Coaxial toothed wheel 3 comes in touch with the lower surface of the card beginning, for instance, with saw tooth 3-2 and then in sequence, with teeth 3-3, 3-4, 3-5, 3-6 and so forth.

As trigger lever 2 is rotated in the direction of arrow 12, tail-end 5b of index lever 5 is brought into contact with second stopper means 19, preferably in the form of a pin, which is mounted on frame 1. As the rotation of trigger lever 2 and the wheels and plate affixed to shaft 11 continues under the influence of card 9, index lever 5 rotates in the direction of arrow 22 around pin 16, thereby taking toothed end 5a out of engagement with ratchet wheel 4, thereby permitting continued rotation of ratchet and toothed wheels 4 and 3 and slitted circular plate 13 even though the excursion of trigger lever 2 is limited. The tip diameter of the teeth on wheel 3 is so selected as to cause said wheel to rotate readily as the result of the transit of card 9 across the tips of said teeth.

Once card 9 has transited said device, biasing means 8 draws said trigger lever in the direction indicated by the arrow 22, restoring said trigger lever to standby position in engagement with first stopper means 18 as shown in FIG. 3. Moreover, index lever 5 is rotated around pin 16 in the direction indicated by arrow 21 in FIG. 3, thereby engaging said index lever with ratchet wheel 4 to bring said ratchet wheel and toothed wheel and slitted wheel to a halt. The device is thereby placed in reset condition by the effect of biasing means 8 and is ready for transit of the next card.

Reference numeral 14 indicates a light-source means and a light-sensing means for sending a beam of light through the slits in circular plate 13 and also serves to generate corresponding electrical signals, these constituting the clock signals necessary for reading data on a card which has no timing marked thereon.

The clock-signal-producing device in accordance with the present invention makes it possible to realize a card reader which transfers cards therethrough with great rapidity. Moreover, the device is small in size and is simple in construction so that it can be manufactured and sold at low cost.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A clock-signal-producing device, comprising
   a frame;
   card-transfer rollers and card-guiding means for transferring and guiding through said device a card having slots therein and bearing data thereon in the form of marks or punched holes;
   a trigger lever having an end and a shaft, said shaft being mounted on said frame, said trigger lever being mounted for rotation from a standby position to a rotated position under the urging of the forward end of a card in transit through said device and for permitting said card to pass over said end when in rotated position;
   a coaxial toothed wheel mounted fixedly to said shaft for making contact with a card transiting said device and for rotating on said shaft under the urging of said card against the teeth of said wheel;
   an indexing ratchet wheel affixed to said shaft for rotation therewith and with said coaxial toothed wheel;
   an index lever having a tooth end and a tail end mounted for rotation on said trigger lever between a standby position and an operating position, said tooth end in said standby position of said index lever engaging said ratchet wheel for holding said ratchet wheel, said shaft and said toothed wheel stationary;
   biasing spring means having two ends, one end being affixed to said frame and the other end being affixed to said tail end for biasing said index lever into engagement with said ratchet wheel and said trigger lever toward standby position;
   first stopper means mounted on said frame for limiting the rotation of said trigger lever under the urging of said biasing means and thereby establishing said standby position;
   second stopper means for limiting the excursion of said index lever by engagement of said tail end with said second stopper means when said trigger lever is rotated by transit of a card and for thereby disengaging said tooth end from said ratchet wheel so that said ratchet wheel and coaxial toothed wheel can rotate independently of said trigger lever.
   a circular plate affixed to said shaft for rotation theerwith and with said toothed wheel, said plate having a plurality of slits around the circumference thereof; and
   light-generating and light-sensing means for optically sensing transit of said slits during rotation of said plate and for generating corresponding electrical signals.

2. The clock-signal-producing device, as defined in claim 1, wherein the numbers of teeth on said ratchet wheel and on said coaxial toothed wheel are the same.

3. The clock-signal-producing device, as defined in claim 1, wherein the teeth on said toothed wheel are of the shape of those on a saw.

4. The clock-signal-producing device, as defined in claim 1, wherein the number of teeth on said toothed wheel and the number of slits on said plate are the same.

5. The clock-signal-producing device, as defined in claim 1, wherein said trigger lever has mounted on said end a wheel for making contact with said card and facilitating the transit of said card across said end of said trigger lever.

* * * * *